Sept. 1, 1964   E. RYSER   3,146,506
COVERED SLIDE FASTENER
Filed Jan. 23, 1961

United States Patent Office
3,146,506
Patented Sept. 1, 1964

3,146,506
COVERED SLIDE FASTENER
Ernst Ryser, Via Turconi, Mendrisio, Tessin, Switzerland, assignor of one-half to Bertrand Voumard, La Chaux-de-Fonds, Switzerland
Filed Jan. 23, 1961, Ser. No. 84,008
Claims priority, application Switzerland Mar. 31, 1960
4 Claims. (Cl. 24—205.1)

The present invention relates to covered slide fasteners.

In heretofore known covered slide fasteners having the fastener members formed directly on the longitudinal rim of the stringers by die-casting, the head of the fastener members, when viewed in the longitudinal direction of the fastener, is provided on one side with a wedge-shaped projection and on the other side with a corresponding recess. The stringer extends from the fastener member laterally of the head thereof. For the transverse locking of such fasteners, i.e. in order to prevent disengagement of the fastener members in a direction perpendicular to the plane of the fastener, projections are provided on the heads of the fastener members in the known fasteners in the form of abutment surfaces extending parallel to the stringer. This impairs to a certain extent the flexibility of the fastener in the transverse direction and requires the use of heads of substantial width.

It is a prime object of the present invention to prevent this drawback of rigidity and excess width of the known slide fasteners.

To this end the slide fastener according to the invention is provided at the side of each member head at which the stringer leaves the latter, with a first abutment surface, facing the fastener plane and inclined at an acute angle with respect to the longitudinal middle plane of the fastener and a second abutment surface opposite to the fastener plane and inclined with respect to the longitudinal middle plane at a complementary angle to the first-mentioned angle, the planes of these abutment surfaces intersecting each other at least approximatively in the longitudinal middle plane of the fastener.

Figure 1:
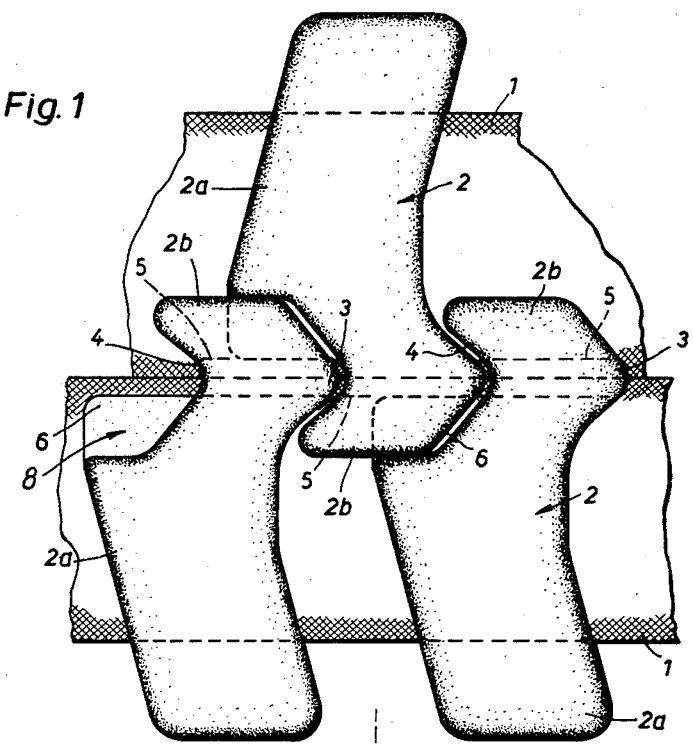
Figure 2:
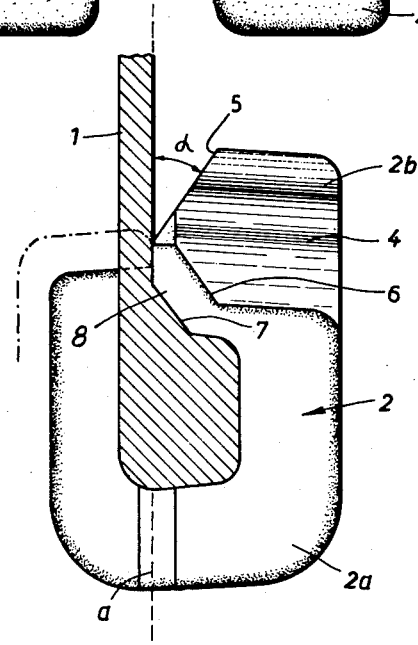

Other features and advantages of the invention will become apparent upon consideration of an embodiment of a slide fastener given by way of example only, in the accompanying drawings in which:

FIG. 1 is a plan view showing a part of a slide fastener according to the invention, and FIG. 2 is a cross-section through one half of the slide fastener shown in FIG. 1.

The covered slide fastener shown in FIGURES 1 and 2 comprises fastener members 2, made of metal or of any appropriate synthetic material die-cast directly on the single, bead-shaped longitudinal rim of the stringers 1. Each fastener member 2 has a base 2a enclosing the bead of the stringer and a head 2b arranged laterally of the outlet in the base for the stringer. The head 2b has a leading edge projection 3 of triangular outline and a corresponding trailing edge recess 4. Furthermore, the head 2b is provided with an abutment surface 5 facing away from the base 2a and inclined at an angle α with respect to the longitudinal middle plane a of the fastener. A shelf 8 extends laterally from the base and partially extends within the trailing edge recess 4. The shelf includes an upper surface 6 which is inclined with respect to the longitudinal middle plane a at an angle equal and opposite the surface 5 whereby planes containing said surfaces form a V-shape. The planes containing both mentioned surfaces intersect each other in a plane parallel to the longitudinal middle plane a of the fastener. However the line of intersection could also be included in the longitudinal middle plane a itself. The acute angle α preferably is between 20° and 40°.

When the fastener is closed the surface 5 of all members 2 of one row of fastener members bears against the surface 6 of the shelf 8 of the corresponding members of the other row.

As is clearly visible from FIGURE 2 the guiding surface 7 which is closer to the head and serves to guide the stringer leaving the member base extends parallel to the abutment surface 6.

I claim:

1. A covered slide fastener of the type including two longitudinal rows of fastener members connected to respective stringer members, the fastener members having a common middle plane, each fastener comprising a base operatively engaging one of the stringer members to support the respective fastener member therefrom, a head on said base projecting laterally beyond the associated stringer member and adapted for cooperating with a corresponding fastener member on the other of the stringer members to engage the same, said head including a leading edge projection of generally triangular outline and having a trailing edge recess of corresponding outline so that the leading edge of one fastener member can be accommodated in the trailing edge of a corresponding fastener member on the other of the stringers, said head having an abutment surface facing away from the associated base and extending from the leading edge projection towards the trailing edge recess inclined with respect to the middle plane, each said fastener member further comprising a shelf extending laterally from the base and partially extending within the trailing edge recess of the head of the associated fastener member, said shelf including an upper surface inclined relative to the middle plane at an angle opposite and equal to that of the abutment surface of the head such that planes containing said surfaces form a V-shape, said surfaces being positioned relative to one another to permit the abutment surfaces of the heads of the fastener members of one row to bear against the upper surfaces of the shelves of corresponding fastener members on the other row while the leading edge projections of the fastener members of said one row are accommodated in the trailing edge outline of the fastener members of said other row whereby said fastener members can be interengaged for closing purposes.

2. A slide fastener as claimed in claim 1 wherein said stringer members are adapted for abutting one another along a plane of contact with the fastener members in closed position, said planes containing said surfaces intersecting along a line which lies in said plane of contact of the stringer members.

3. A slide fastener as claimed in claim 1 wherein said surfaces are inclined with respect to said middle plane of the respective fastener member at an angle of between 20 and 40 degrees.

4. A fastener comprising a pair of stringer members, a longitudinal row of fastener members on each of the stringer members adapted for being respectively interengaged for closing said fastener along a longitudinal plane, said fastener members having a common middle plane and comprising a base operatively engaging one of the stringer members to support the associated fastener member from, a head on said base projecting laterally beyond the associated stringer member, said head including a leading edge projection of triangular outline and having a trailing edge recess of corresponding triangular outline, said head having an under portion including an abutment surface facing in a direction away from the associated base and extending from the leading edge projection towards the trailing edge, said abutment surface lying inclined with respect to said middle plane of the fastener member, a shelf laterally extending from the base and partially extending within the trailing edge recess of the head, said shelf including a surface spaced from the associated stringer member and inclined with respect to the aforementioned middle plane at an angle equal and opposite to that of the abutment surface whereby said surfaces form a V having an obtuse angle defined therein, said surfaces lying on substantially the same level and being positioned substantially equally on opposite sides of the longitudinally plane of closure of the fastener such that the abutment surfaces of the heads of the fastener members of each row bear against the surfaces of the shelves of corresponding fastener members on the other row while the leading edge projections of the fastener members of each row are accommodated in the trailing edge recesses of corresponding fastener members of the other row whereby said fastener members can be interengaged for closing purposes.

References Cited in the file of this patent

UNITED STATES PATENTS

| | | |
|---|---|---|
| 2,184,265 | Winterhalter | Dec. 19, 1939 |
| 2,263,920 | Dau | Nov. 25, 1941 |
| 2,392,934 | Marinsky | Jan. 15, 1946 |
| 2,910,754 | Morin | Nov. 3, 1959 |
| 2,959,833 | Ryser | Nov. 15, 1960 |

FOREIGN PATENTS

| | | |
|---|---|---|
| 201,777 | Australia | May 10, 1955 |